United States Patent
Takahashi (10) Patent No.: US 10,136,067 B2
(45) Date of Patent: Nov. 20, 2018

(54) OBSERVATION APPARATUS PROVIDING AN ENLARGED DISPLAY FOR FACILITATING CHANGING AN IMAGE-PICKUP CONDITION

(71) Applicant: Olympus Corporation, Hachioji-shi, Tokyo (JP)

(72) Inventor: Atsushi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/137,444

(22) Filed: Apr. 25, 2016

(65) Prior Publication Data
US 2016/0323513 A1    Nov. 3, 2016

(30) Foreign Application Priority Data

May 1, 2015    (JP) ................................. 2015-093819

(51) Int. Cl.
*H04N 5/232*    (2006.01)

(52) U.S. Cl.
CPC ..... *H04N 5/23293* (2013.01); *H04N 5/23212* (2013.01); *H04N 5/23216* (2013.01); *H04N 5/23296* (2013.01)

(58) Field of Classification Search
CPC .......... H04N 5/23293; H04N 5/23296; H04N 5/2353; H04N 5/23212; H04N 5/23216
See application file for complete search history.

(56) References Cited

U.S. PATENT DOCUMENTS

| | | | | |
|---|---|---|---|---|
| 5,696,530 | A * | 12/1997 | Maejima ............... | G06F 3/0481 345/671 |
| 6,349,172 | B1 * | 2/2002 | Tanaka .................. | G03B 13/32 396/137 |
| 2012/0083222 | A1 * | 4/2012 | Kawashimo ............ | H04B 5/02 455/68 |
| 2013/0083234 | A1 * | 4/2013 | Shigeta ................. | H04N 5/232 348/360 |
| 2013/0162879 | A1 * | 6/2013 | Yoshida ............ | H04N 5/23212 348/333.08 |

(Continued)

FOREIGN PATENT DOCUMENTS

JP    2013-126177    6/2013

OTHER PUBLICATIONS

First Office Action to corresponding Chinese Patent Application No. 201610258468.X, dated Jul. 30, 2018 (9 pgs.) with translation (7 pgs.).

*Primary Examiner* — Gevell Selby
(74) *Attorney, Agent, or Firm* — John C. Pokotylo; Pokotylo Patent Services (57) ABSTRACT

An observation apparatus includes an image-pickup control unit configured to set an image-pickup condition of an image-pickup unit so as to control the image-pickup unit, and an enlargement control unit configured to conduct control so that display enlargement is conducted for part of an observation image picked up by the image-pickup unit when a prescribed manipulation is made while the observation image is displayed and to control the image-pickup control unit so that at least a portion of the image-pickup condition set on the basis of an observation image that is not enlarged is changed and set on the basis of a target for which the display enlargement is to be conducted.

8 Claims, 11 Drawing Sheets

(56) References Cited

U.S. PATENT DOCUMENTS

| | | | |
|---|---|---|---|
| 2013/0239050 A1* | 9/2013 | Ohashi | G06F 3/0481 |
| | | | 715/800 |
| 2014/0320702 A1* | 10/2014 | Tsubusaki | H04N 5/23296 |
| | | | 348/240.3 |
| 2015/0009372 A1* | 1/2015 | Min | H04N 5/247 |
| | | | 348/262 |

* cited by examiner

OBSERVATION APPARATUS PROVIDING AN ENLARGED DISPLAY FOR FACILITATING CHANGING AN IMAGE-PICKUP CONDITION

CROSS-REFERENCE TO RELATED APPLICATIONS

This application is based upon and claims the benefit of priority of the prior Japanese Patent Application No. 2015-93819, filed on May 1, 2015, the entire contents of which are incorporated herein by reference.

BACKGROUND OF THE INVENTION

Field of the Invention

The present invention is related to an observation apparatus having a display enlargement function.

Description of the Related Art

The fields of microscopy and endoscopy widely use observation apparatuses that display a subject image picked up by an image pickup element so as to observe the subject. The live-view function of cameras can also be considered an observation function, and cameras, in that sense, also have observation apparatuses.

Usually, the autofocus (AF) function adjusts the focus; however, the focus is often adjusted manually while looking at the screen instead of using the AF function when it is desired that a particular portion of the subject be brought into focus.

However, because the focus is adjusted manually while looking at the screen, the adjustment is not easy in some cases such as when the portion that is to be brought into focus is a small area or the portion has a color or outline that does not allow it to be clearly distinguished from neighboring portions. In view of this, a camera is proposed that displays a portion on the screen in an enlarged manner when the focus is adjusted manually. In Patent Document 1, for example, a camera is proposed that displays a portion on the screen at an enlarging ratio responsive to the set aperture.
[Patent Document 1] Japanese Laid-open Patent Publication No. 2013-126177

SUMMARY OF THE INVENTION

An observation apparatus according to the present embodiment includes: an image-pickup unit configured to pick up an image; an image-pickup control unit configured to set an image-pickup condition of an image-pickup unit so as to control the image-pickup unit; and an enlargement control unit configured to conduct control so that display enlargement is conducted for part of an observation image picked up by the image-pickup unit when a prescribed manipulation is made while the observation image is displayed and to control the image-pickup control unit so that at least part of the image-pickup condition set on the basis of an observation image that is not enlarged is changed and set on the basis of a target for which the display enlargement is to be conducted.

DETAILED DESCRIPTION OF THE PREFERRED EMBODIMENTS

Figure 1:
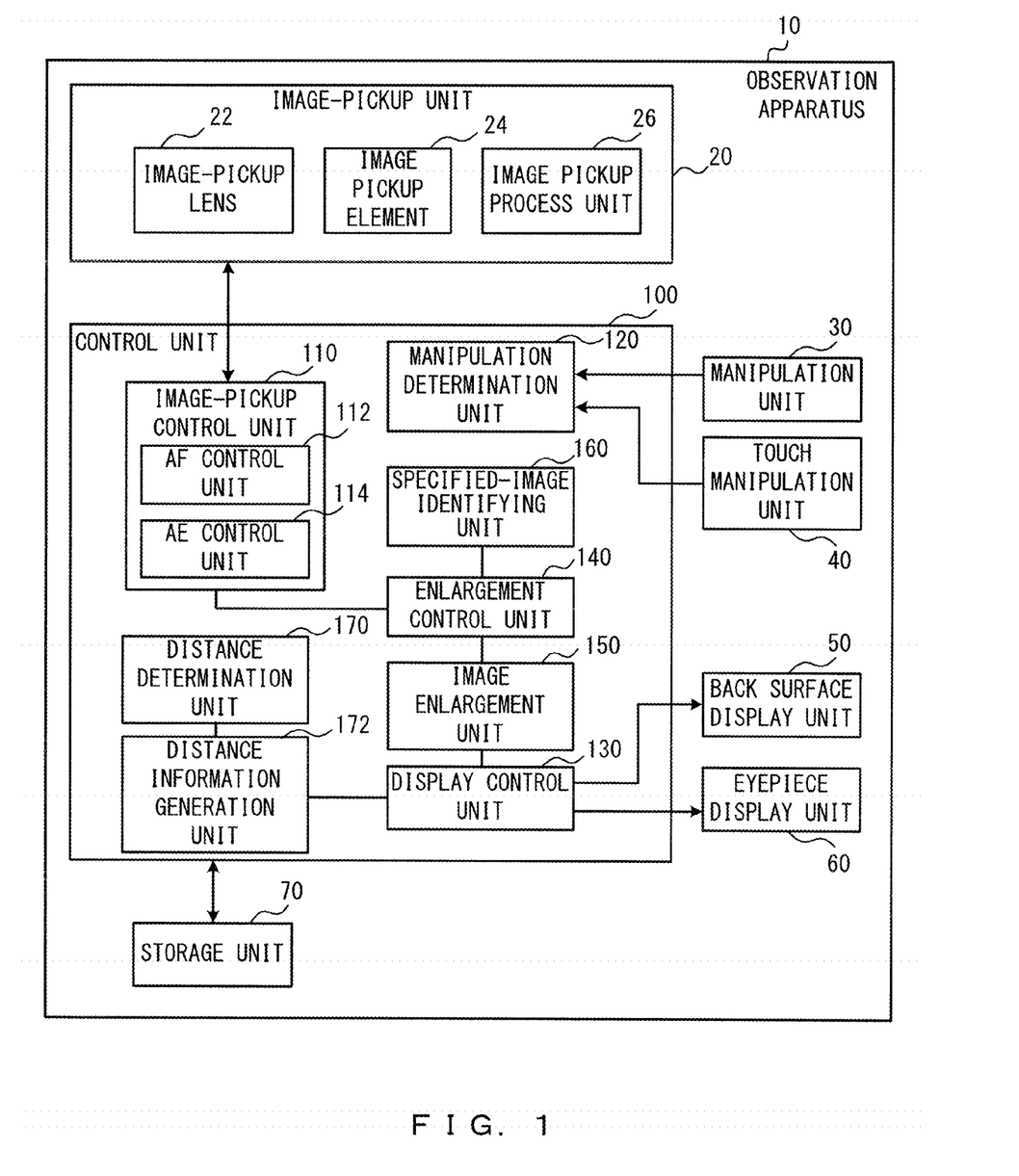
FIG. 1 is a block diagram for explaining main functions of an observation apparatus according to the main invention.
Figure 2:
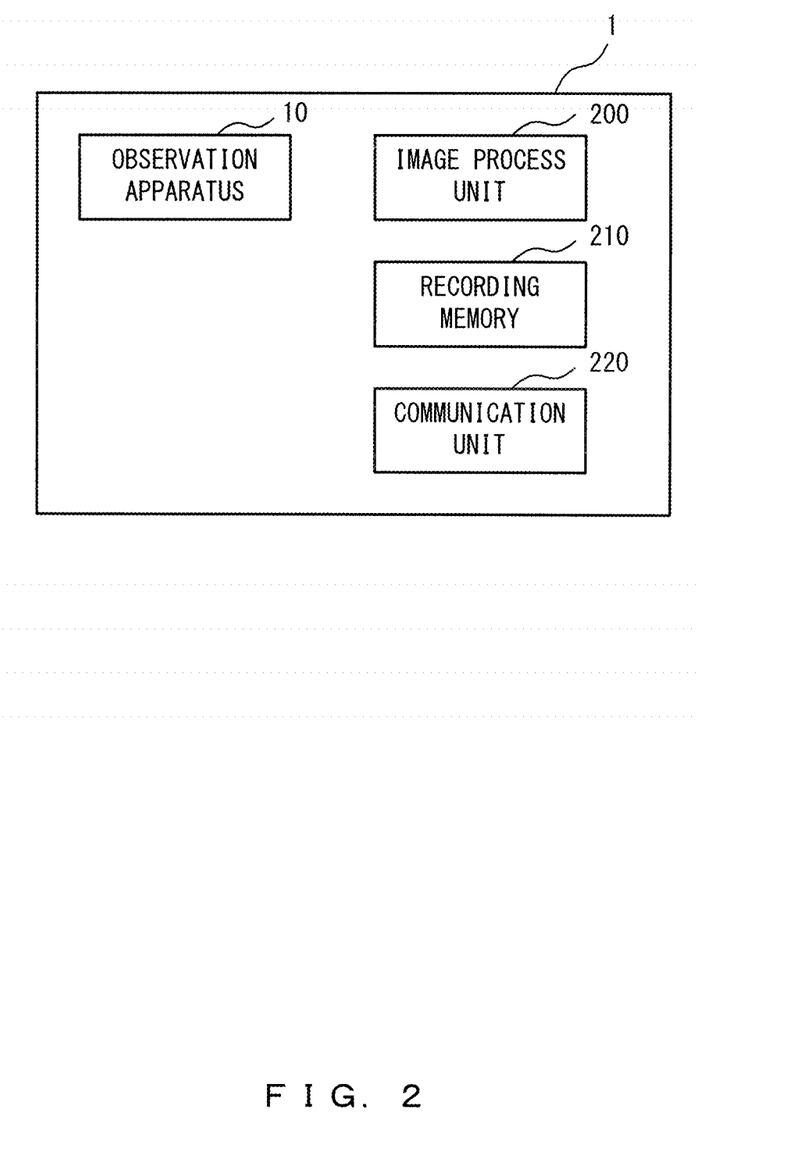
FIG. 2 is a block diagram of an image pickup device including the observation apparatus.

Hereinafter, the embodiments of the present invention will be explained by referring to the drawings. In the present embodiment, an observation apparatus 10 according to the present invention will be explained by using an example in which it is included in an image pickup device 1 (camera). FIG. 1 is a block diagram for explaining main functions of the observation apparatus 10 according to the present invention. Also, FIG. 2 is a block diagram of the image pickup device 1 including the observation apparatus 10.

Referring to FIG. 1, the observation apparatus 10 picks up an image of the subject so as to display the picked-up image for observation. The observation apparatus 10 is included in for example the image pickup device 1 such as a camera etc., and conducts live view display during the pickup of the image. Also, the observation apparatus 10 is included not only in the image pickup device 1 but also in a microscope or an endoscope. An observation image displayed in the display unit by the observation apparatus 10 is referred to as a live view image for the sake of consistency of terms about the image pickup device 1.

The observation apparatus 10 includes an image-pickup unit 20, a manipulation unit 30, a touch manipulation unit 40, a back surface display unit 50, an eyepiece display unit 60, a storage unit 70, a control unit 100, etc. The image-pickup unit 20 picks up an image of the subject and outputs picked-up image data that is displayed as a live view image. The image-pickup unit 20 includes an image-pickup lens 22, an image pickup element 24, an image pickup process unit 26, etc.

The image-pickup lens 22 forms the subject image on the image pickup element 24. The image-pickup lens 22 includes a focus lens that adjusts the focus position, a zoom lens that adjusts the focal length, a diaphragm that adjusts the amount of light, a shutter that adjusts the exposure time, and a drive system that drives these components.

The image pickup element 24 is a photoelectric conversion element such as a CCD, a CMOS, etc., and outputs an image signal based on a subject image formed by the image-pickup lens 22. The image pickup process unit 26 drives the image pickup element 24, and performs an AGC process or a CDS process on an image signal obtained from the image pickup element 24, and performs AD conversion in order to output the picked-up image data.

The manipulation unit 30 inputs a manipulation instruction from the user. The manipulation unit 30 has various types of buttons and a focus ring for manually adjusting the focus position. The touch manipulation unit 40 is a touch panel for inputting a manipulation instruction from the screen, and is integrated with the back surface display unit 50.

The back surface display unit 50 is disposed on the back surface of the image pickup device 1 so as to display an image picked up by the image-pickup unit 20 as the live view image. The eyepiece display unit 60 displays an image picked up by the image-pickup unit 20 as the live view image, and is disposed on an upper portion of the image pickup device 1. The eyepiece display unit 60 includes a display element that is smaller than the back surface display unit 50, and an eyepiece lens is provided to the front surface of the display element so that observation is possible by looking into it.

The storage unit 70 is of a random access memory (RAM), a read only memory (ROM), a non-volatile memory, etc. The storage unit 70 functions as a program area for storing various types of programs including a control program for controlling a central processing unit (CPU) that is a constituent of the control unit 100 or functions as a data area for storing various types of data.

The control unit 100 controls the entirety of the observation apparatus 10 and the image pickup device 1 in a general manner. The control unit 100 includes a CPU, and a CPU having read the control program from the storage unit 70 executes the control process. The control unit 100 includes, as function units executed by the CPU, an image-pickup control unit 110, a manipulation determination unit 120, a display control unit 130, an enlargement control unit 140, an image enlargement unit 150, a specified-image identifying unit 160, a distance determination unit 170, a distance information generation unit 172, etc.

The image-pickup control unit 110 sets an image-pickup condition for the image-pickup unit 20 so as to control the image-pickup unit 20. The image-pickup control unit 110 includes an AF (auto focus) control unit 112 and an AE control unit 114. The AF control unit 112 detects a focal point, and moves the focus lens of the image-pickup unit 20 to the detected focal point. The focal method may be a contrast method or alternatively may be an imaging plane phase difference method when the image pickup element 24 is an element suitable for an imaging plane phase difference method. The AF control unit 112 detects a focal point by using a contrast method or an imaging plane phase difference method in a detection area specified or set on the screen. The AF control unit 112 sets the center of the screen as the detection area under normal conditions.

The AE control unit 114 detects the luminance of the subject so as to adjust the exposure of the image-pickup unit 20. The AE control unit 114 detects the brightness of the image in the scope set in the screen, and adjusts the diaphragm and shutter speed of the image-pickup lens 22, or the ISO sensitivity so that the brightness becomes appropriate.

The manipulation determination unit 120 determines the content of a manipulation instruction from a signal input into the manipulation unit 30 or the touch manipulation unit 40. The display control unit 130 controls the back surface display unit 50 or the eyepiece display unit 60 so as to display the live view image in the back surface display unit 50 or the eyepiece display unit 60. Hereinafter, picked-up images displayed on the back surface display unit 50 or the eyepiece display unit 60 are referred to as live view images.

The enlargement control unit 140 controls display enlargement, in which part of a picked-up image is enlarged.

The image enlargement unit 150 controls the enlargement control unit 140 so as to enlarge part of a picked-up image. The image enlargement unit 150 extracts data in a specified region from picked-up image data, and generates enlarged image data for one screen by using an interpolation process etc. Enlarged image data is displayed on the back surface display unit 50 as the live view image enlarged by the display control unit 130.

The specified-image identifying unit 160 identifies an image specified by the manipulating person (referred to as a specified image hereinafter) from among live view images, and detects the position of a specified image that changes in the live view image. The specified-image identifying unit 160 identifies an image existing in a specified scope by an outline or color that serves as a feature, and stores a feature point in the storage unit 70. Then, even when the specified image has moved during display enlargement, the specified-image identifying unit 160 identifies the position of the specified image from the entire image by the identified outline or color. Then, the image enlargement unit 150 enlarges the region including the position of the specified image that was identified by the specified-image identifying unit 160.

The distance determination unit 170 determines the distance from the subject corresponding to the specified image that is to be enlarged (referred to as an enlargement target hereinafter) to the observation apparatus 10. The distance determination unit 170 determines the distance by using the AF control unit 112. The distance information generation unit 172 generates a "distance bar", which represents the image-pickup distance, and distance information that is a result of superimposing "distance to enlargement target" and "focus position" on this "distance bar". Distance information is displayed on the enlarged image by the display control unit 130 when display enlargement is conducted. Distance information will be explained in detail by referring to FIG. 10 and FIG. 11.

Then, the enlargement control unit 140 controls the image-pickup control unit 110, the image enlargement unit 150, the specified-image identifying unit 160, the distance determination unit 170 and the distance information generation unit 172 so as to conduct display enlargement. When a prescribed manipulation is made from the manipulation unit 30 or the touch manipulation unit 40 while the live view image is displayed, the enlargement control unit 140 starts display enlargement. When an image to be enlarged is specified in the touch manipulation unit 40, the enlargement control unit 140 sets the specified image as the enlargement target, and when no image is specified, the enlargement control unit 140 makes a prescribed area around the center of the screen the enlargement target.

Then, the enlargement control unit 140 controls the image-pickup control unit 110 so that at least some of the image-pickup conditions set on the basis of an observation image that has not been enlarged are changed on the basis of the target for which display enlargement will be conducted. Specifically, the enlargement control unit 140 makes the image-pickup control unit 110 change some of the image-pickup conditions such as for example a detection region for adjusting the exposure and the focus position from the picked-up image before the enlargement to the enlargement target image. For example, under the control of the image-pickup control unit 110, the AF control unit 112 adjusts the focus position by referring to the center of the entire picked-up image before the enlargement, while it adjusts the focus position by referring to the center of the enlargement-target image during the display enlargement.

Next, by referring to FIG. 2, brief explanations will be given for the configuration of the image pickup device 1. The image pickup device 1 includes an image process unit 200, a recording memory 210, and a communication unit 220 in addition to the observation apparatus 10. The image process unit 200 includes an interpolation process unit for interpolating picked-up image data output from the image-pickup unit 20, an AWB process unit and a compression/expansion process unit (not shown). The recording memory 210 is for example a flash memory, and records picked-up image data compressed by the image process unit 200. The communication unit 220 communicates image data directly with an external device via USB connection or communicates image data with an external device via a network by Wi-Fi etc.

Figure 3:
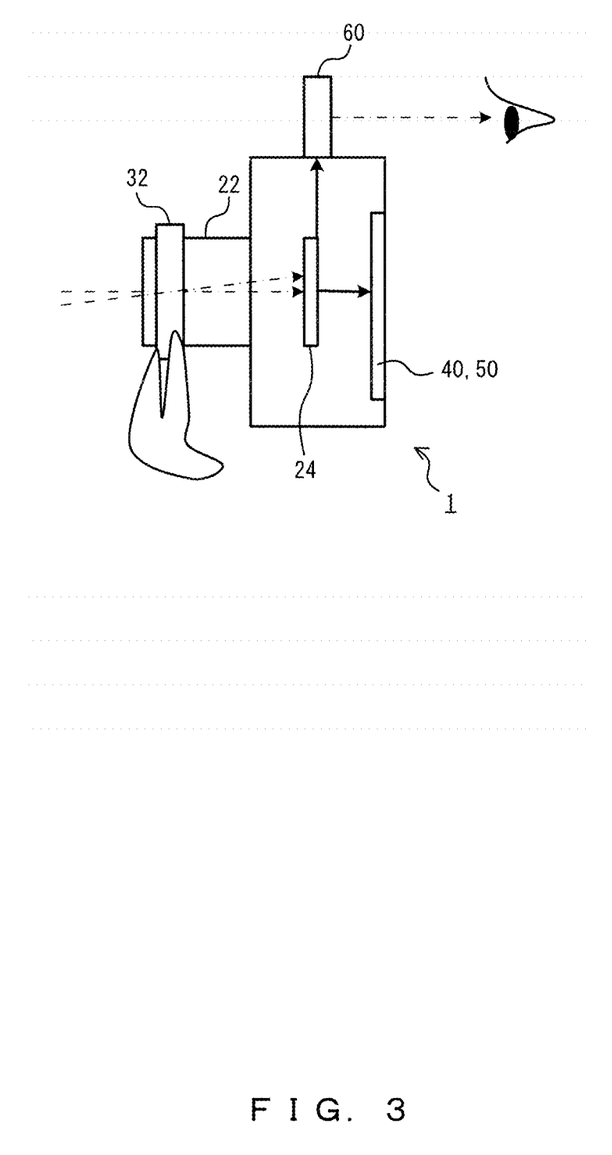
FIG. 3 is the image pickup device, seen from the side, in a state in which it is held by the user.

FIG. 3 shows the image pickup device 1, seen from the side, in a state in which it is held by the user. The subject light incident on the image pickup device 1 is formed on the image pickup element 24 by the image-pickup lens 22. The subject light formed on the image pickup element 24 is converted into image data so as to be displayed as the live view image on the back surface display unit 50 disposed on the back surface of the image pickup device 1 or the eyepiece display unit 60 disposed on the upper surface of the image pickup device 1.

Also, around the image-pickup unit 20, a focus ring 32 is provided for the manual adjustment of the focus position. The user conducts so-called manual focusing, in which the user uses a hand so as to turn the focus ring 32 while looking at the live view image displayed on the eyepiece display unit 60, and thereby can conduct fine adjustment of the focus position. When for example the entire flower is to be brought into focus, the AF can be used, while when a particular petal of the flower is to be brought into focus, it is necessary to adjust the focus manually.

Figure 4:
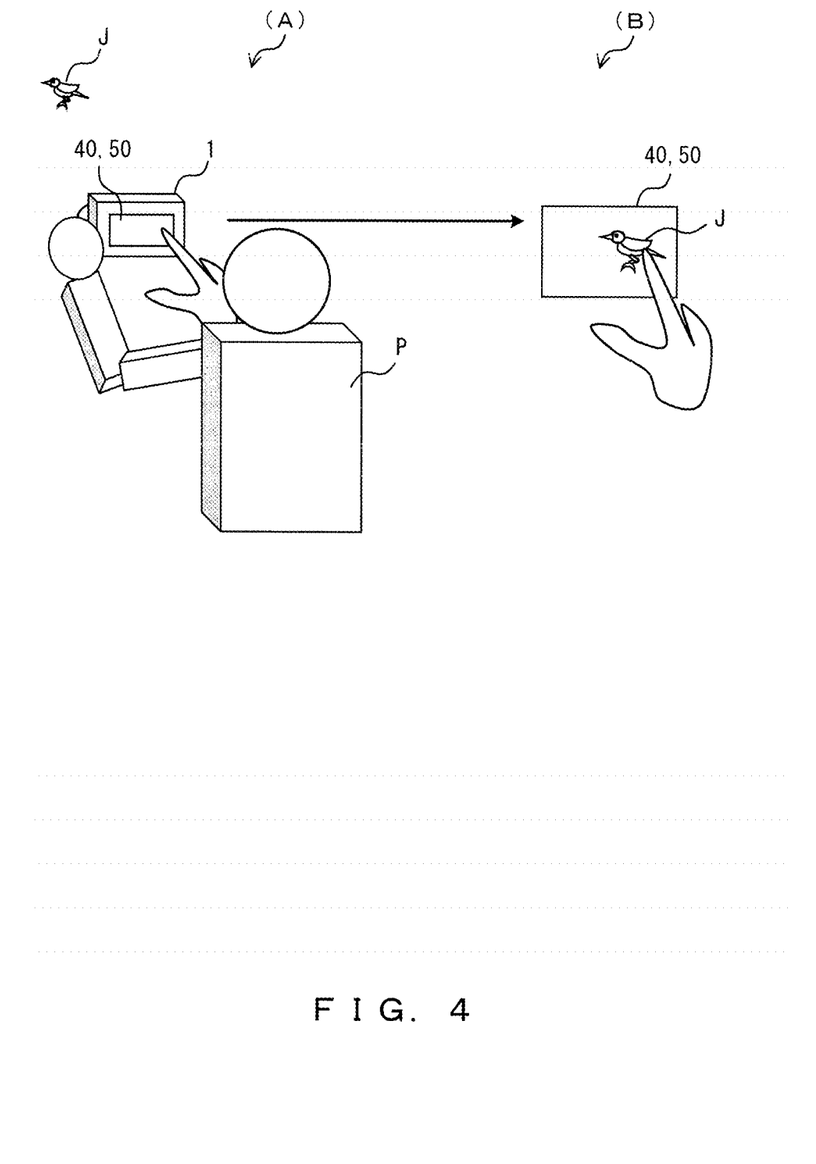
FIG. 4 shows an example of an image-pickup scene using the image pickup device.

FIG. 4 shows an example of an image-pickup (observation) scene in which the image pickup device 1 is used. In scene (A) shown in FIG. 4, user P holds the image pickup device 1 targeting subject J and is waiting for a chance to pick up the image of subject J on the back surface display unit 50. In scene (B) shown in FIG. 4, subject J displayed on the back surface display unit 50 is specified. In the image pickup device 1, an image specified via a touch manipulation on the touch manipulation unit 40 (back surface display unit 50) becomes the enlargement target.

Figure 5:
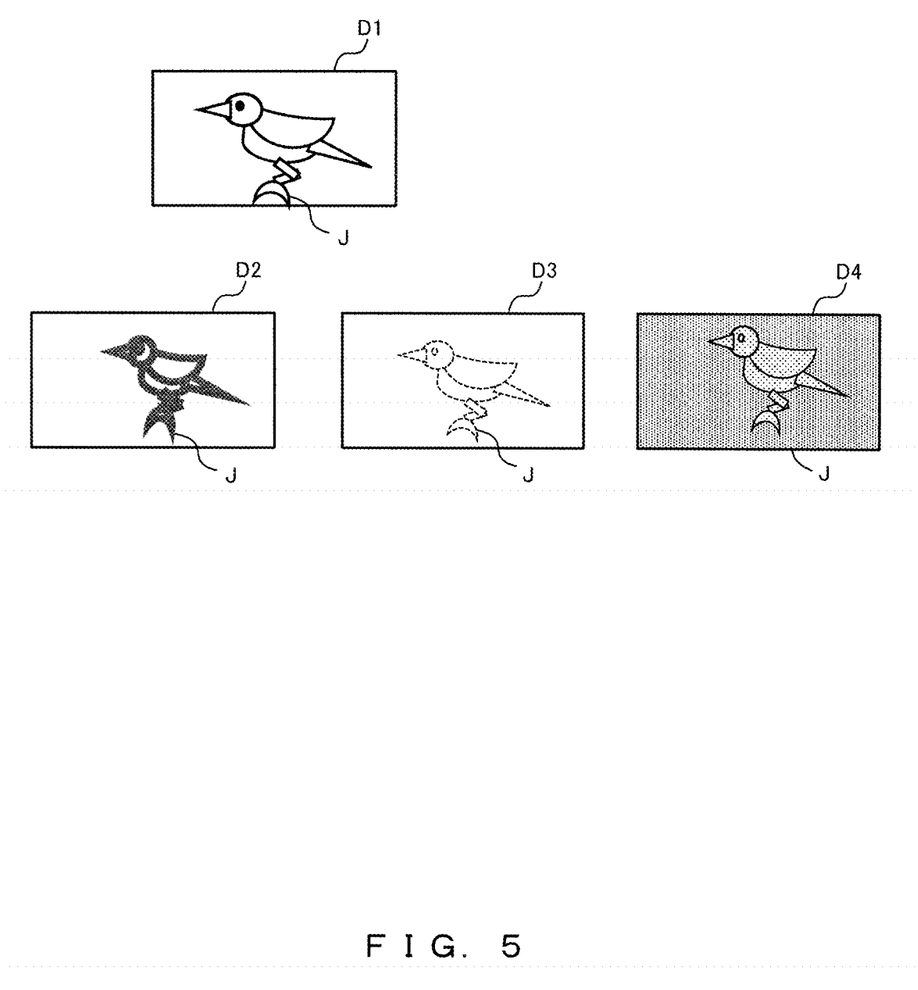
FIG. 5 shows an example of an enlarged image displayed on a back surface display unit or an eyepiece display unit.

FIG. 5 shows an example of an enlarged image displayed on the back surface display unit 50 or the eyepiece display unit 60. Image D1 shown in FIG. 5 is an enlarged image according to the present embodiment, and is of a case where subject J is displayed clearly. Displaying an enlarged image like this allows focus adjustment via manual focusing for bringing the head of subject J into focus.

Images D2 through D4 shown in FIG. 5 are enlarged images that have been enlarged without using the display enlargement of the present embodiment. Regarding enlarged images like these, recognizing the subject is difficult and the manipulation of the following manual focusing is also difficult. Image D2 shown in FIG. 5 shows a case when subject J is not in focus. Image D3 shown in FIG. 5 shows a case when overexposure has occurred for subject J and flared highlights have almost occurred. Image D4 shown in FIG. 5 shows a case where underexposure has occurred for subject J and blown out highlights have almost occurred. When enlarged images are like images D2 through D4 shown in FIG. 5, the purpose of enlarging images is defeated.

Figure 6:
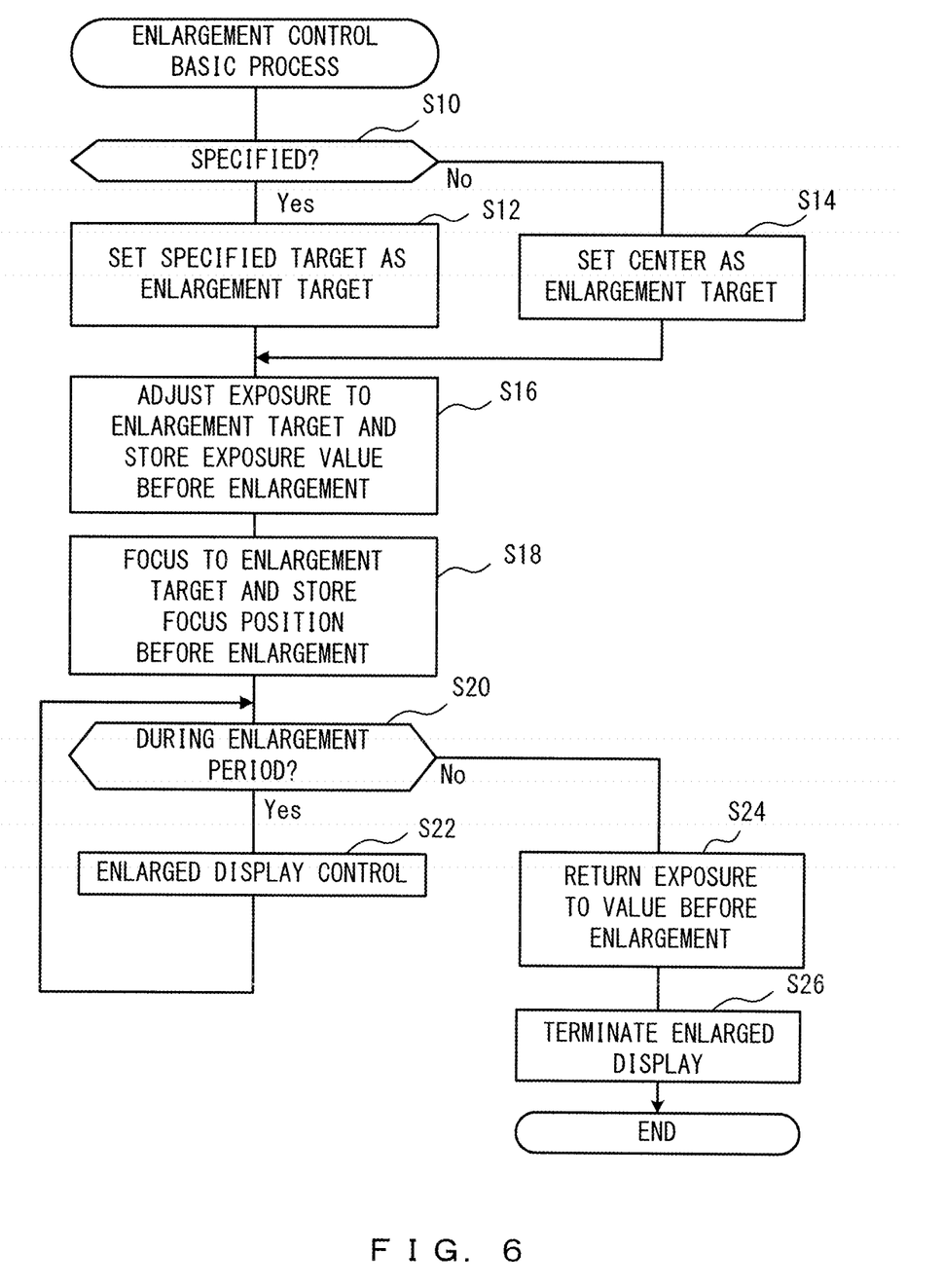
FIG. 6 is a flowchart for showing a fundamental enlargement control process according to the present embodiment.

FIG. 6 is a flowchart for showing a fundamental enlargement control process according to the present embodiment. Note that the process in FIG. 6 is referred to as a basic enlargement control process for the description from the specific enlargement control process explained in FIG. 7 and the subsequent figures.

The enlargement control unit 140 determines whether or not a target for which display enlargement is conducted has been identified (step S10). As shown in FIG. 4(B), the user can specify the target by using the touch manipulation unit 40 etc.

Determining that the display-enlargement target has been specified (Yes in step S10), the enlargement control unit 140 sets the specified target as the display enlargement (step S12), and when the enlargement control unit 140 determines that the display-enlargement target has not been specified (NO in step S10), the enlargement control unit 140 sets the center of the screen as the enlargement target (step S14).

Subsequent to steps S12 and S14, the enlargement control unit 140 controls the AE control unit 114 of the image-pickup control unit 110 so that the exposure is adjusted with reference to the set enlargement target, and stores the exposure value that was used before the enlargement in the storage unit 70 (step S16). The AE control unit 114 sets a photometry area as the enlargement target and adjusts the diaphragm and shutter speed of the image-pickup lens 22, the ISO sensitivity of the image pickup process unit 26, etc. on the basis of the brightness of the enlargement target.

The enlargement control unit 140 controls the AF control unit 112 of the image-pickup control unit 110 so that the set enlargement target is brought into focus, and stores the focus position of the image-pickup lens 22 before the enlargement in the storage unit 70 (step S18). The AF control unit 112 sets the focus area as the enlargement target.

The enlargement control unit 140 determines whether or not it is during a display enlargement period (step S20). When it is within a prescribed period of time since the start of the enlargement, when the focus ring is being manipulated or when the button for terminating the display enlargement has not been pushed, the enlargement control unit 140 determines that it is during a display enlargement period.

Determining that it is during a display enlargement period (Yes in step S20), the enlargement control unit 140 conducts display enlargement control by controlling the image-pickup control unit 110 and the image enlargement unit 150 (step S22), and returns to step S20. Then, the enlargement control unit 140 gives permission for manual focusing during a display enlargement period even when it is in the AF mode. It is also possible for the enlargement control unit 140 to adjust the exposure in response to the enlargement target by using the AE control unit 114 on an as-needed basis.

Determining that it is not during a display enlargement period (No in step S20), the enlargement control unit 140 returns the exposure to the state before the enlargement (step S24). As a matter of course, it is not necessary to "return" to the exact values themselves of the aperture, the shutter speed, the exposure time, the sensitivity, etc. and it is sufficient to "return to the image position of the reference of the exposure mode or the exposure control" so that the situation that is continuously changing can be responded to during the manipulation. In other words, it is sufficient to conduct control in which the entire exposure etc. has been calculated separately from the display enlargement and the entire image is displayed immediately in the latest setting when the display enlargement is terminated. Methods of the returning include a method in which the factors are returned to instantaneously and a method in which the factors are returned to gradually so that human eyes can get comfortable to the change, both of which can be used. Thereby, it is possible to prevent the user from being confused by a factor being changed on the screen other than the expansion/reduction, while maintaining the visibility for confirmation and the ease of manipulations.

The enlargement control unit 140 reads the exposure value that was used before the start of the enlargement process stored in the storage unit 70, and controls the AE control unit 114 so as to set the exposure value that was used before the start of the enlargement process in the image-pickup unit 20. The enlargement control unit 140 stops the enlargement process conducted by the image enlargement unit 150, and terminates the display enlargement (step S26). Note that when an instruction is given in a case when the display has been returned to the display before the enlargement, it is possible to return the setting to the focus position stored in step S18.

While it was described that a reference of "exposure and focus" is set and adjusted for the enlargement target when the display enlargement starts, "exposure and focus" is a representative example of image-pickup conditions that are adjusted in response to the enlargement target, and the scope of the present invention is not limited to this. Image-pickup conditions to be adjusted may include the white balance and may be one of the exposure and the focus. Note that as described above, during this display enlargement period, the manual focus manipulation is possible so that the enlargement target or part of the enlargement target is brought into focus even when it is in the AF mode.

Figure 7:
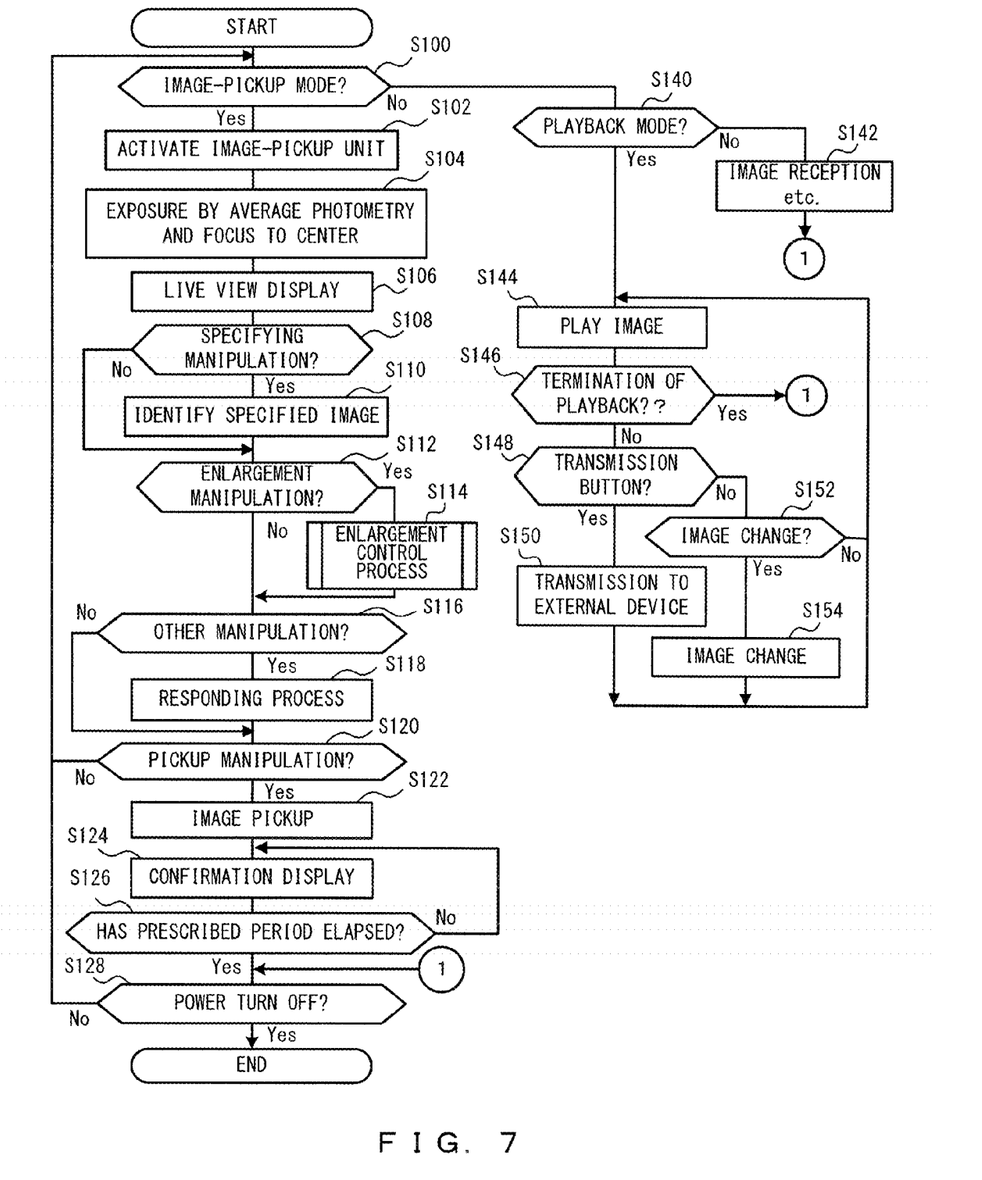
FIG. 7 is a flowchart showing procedures of a specific enlargement control process in the image pickup device.

Next, the enlargement control process shown in FIG. 6 will be explained by using an example in which the process is included in a specific process of the image pickup device 1. FIG. 7 is a flowchart showing the procedures of a specific enlargement control process in the image pickup device 1.

The control unit 100 determines whether or not it is in the image-pickup mode (step S100). The manipulation determination unit 120 determines the operation mode of the image pickup device 1 by for example the position of the mode dial included in the manipulation unit 30.

Determining that it is in the image-pickup mode (Yes in step S100), the image-pickup control unit 110 activates the image-pickup unit 20 (step S102).

The image-pickup control unit 110 sets a photometry area and a focus area under conditions that are set in advance, and adjusts the exposure and the focus on the basis of a set areas. For example, the AE control unit 114 adjusts the exposure on the basis of the average photometry, and the AF control unit 112 adjusts the focus at the center of the image (step S104).

The control unit 100 treats an image picked up by the image-pickup unit 20 as the live view image, and displays it in the back surface display unit 50 or the eyepiece display unit 60 by using the display control unit 130 (step S106). The manipulation determination unit 120 determines whether or not a manipulation of specifying an image has been made by using the touch manipulation unit 40 in the live view image displayed in the back surface display unit 50 (step S108).

When the manipulation determination unit 120 determines that a manipulation has been made for specifying an image (Yes in step S108), the specified-image identifying unit 160 identifies, by an outline or color serving as a feature, an image existing in the scope specified by being touched from the entire image data (step S110), and stores feature data such as an outline, a color, etc. in the storage unit 70. When the manipulation determination unit 120 determines that a manipulation has not been made for specifying an image (No in step S108), the control unit 100 skips step S110.

The manipulation determination unit 120 determines whether or not an enlargement manipulation has been made (step S112). An enlargement manipulation is a manipulation instructing that the above-described display enlargement be conducted. An enlargement manipulation is a manipulation for the focus ring 32 included in the manipulation unit 30. When the manipulation determination unit 120 determines that a prescribed enlargement manipulation has been made (Yes in step S112), the enlargement control unit 140 conducts the enlargement control process. When the manipulation determination unit 120 determines that a prescribed enlargement manipulation has not been made (No in step S112), the enlargement control unit 140 proceeds to step S116. Hereinafter, two specific examples of the basic enlargement control process explained in FIG. 6 will be explained. In order to distinguish the two examples, they will be referred to as the enlargement control processes 1 and 2.

Figure 8:
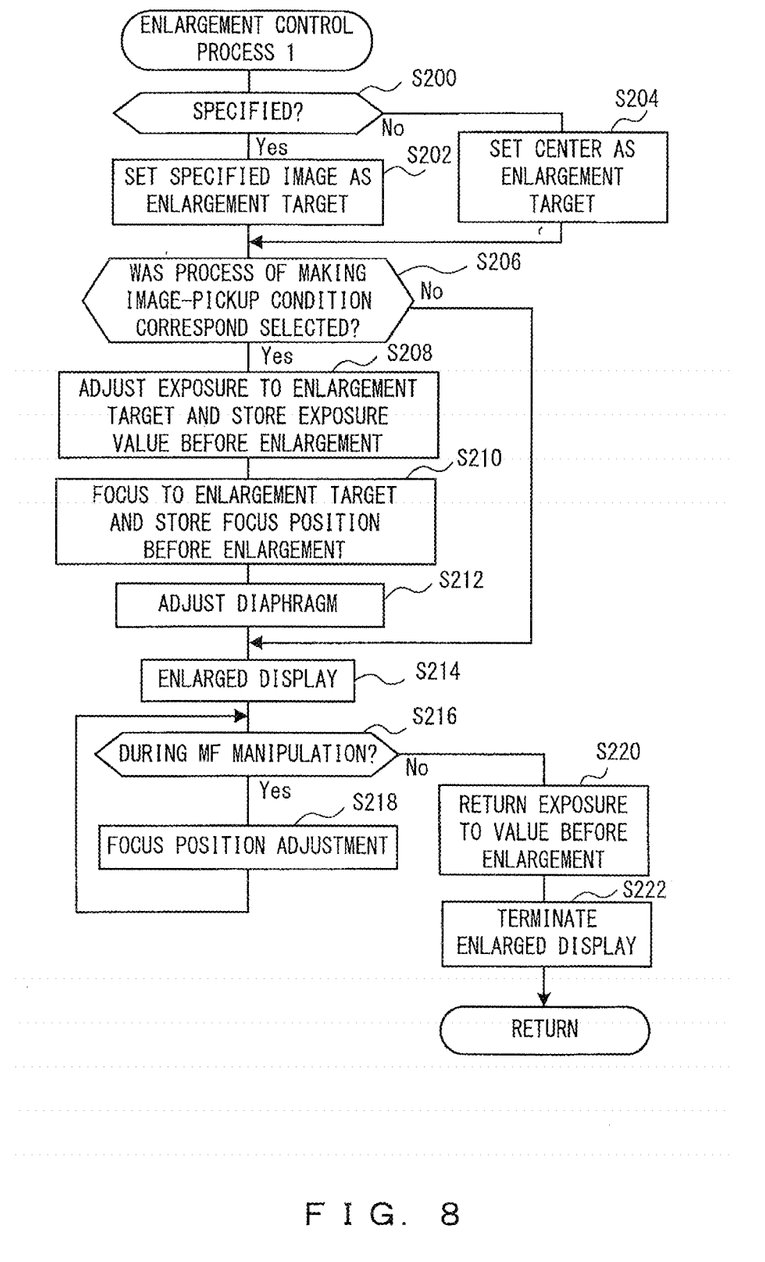
FIG. 8 shows a subroutine that explains procedures of enlargement control process 1.

FIG. 8 shows a subroutine that explains the procedures of enlargement control process 1. The enlargement control unit 140 determines whether or not an image was specified in step S108 (step S200). Determining that an image was specified in step S108 (Yes in step S200), the enlargement control unit 140 sets the specified image as the enlargement target (step S202). Determining that an image was not specified in step S108 (No in step S200), the enlargement control unit 140 sets the center of the screen as the enlargement target (step S204).

The enlargement control unit 140 determines whether or not "process for making image-pickup condition correspond to enlargement target" has been selected (step S206). When for example the button (for example a help button) for selecting "process for making image-pickup condition correspond to enlargement target" is displayed on the back surface display unit 50 and when that button is pushed, the enlargement control unit 140 makes the image-pickup conditions correspond to the enlargement target.

When "process for making image-pickup condition correspond to enlargement target" is not selected, the image-pickup conditions are not changed. Specifically, display enlargement is conducted while the reference of image-pickup conditions remains an image that is not enlarged.

Determining that "process for making image-pickup condition correspond to enlargement target" is selected (Yes in step S206), the enlargement control unit 140 controls the AE control unit 114 of the image-pickup control unit 110 so that the exposure is adjusted by referring to the set enlargement target, and stores the exposure value that was used before the enlargement in the storage unit 70 (step S208).

The enlargement control unit 140 controls the AF control unit 112 of the image-pickup control unit 110 so that the set enlargement target is brought into focus, and stores the focus position of the image-pickup lens 22 that was used before the enlargement in the storage unit 70 (step S210). The AF control unit 112 sets the focus area as the enlargement target, and conducts the focusing.

Also, the enlargement control unit 140 may adjust the diaphragm again after the AF control (step S212). When for example the diaphragm is adjusted to the minimum aperture, it is possible to prevent a situation in which the visual contact with the enlargement target is lost. Adjusting the diaphragm to the maximum aperture by contrast allows more accurate adjustment of the focus position. Note that the diaphragm may be adjusted to the minimum aperture or the maximum aperture for adjusting the exposure in step S208 instead of the process in step S212.

Also, when enlargement control unit 140 determines that "process for making image-pickup condition correspond to enlargement target" is not selected (No in step S206), the enlargement control unit 140 proceeds to step S214. The enlargement control unit 140 controls the image enlargement unit 150 so as to conduct display enlargement for the enlargement target (step S214). Then, the enlargement control unit 140 gives permission for manual focusing.

The enlargement control unit 140 determines whether or not it is during the manual focusing (MF) (step S216). When the focus ring 32 is being manipulated, it is determined to be during the manual focusing, and when a manipulation of the focus ring 32 has not been made for a prescribed period of time or when the return button has been manipulated, it is determined that the manual focus manipulation has been terminated.

When the enlargement control unit 140 determines that it is during the manual focusing (Yes in step 216), the image-pickup control unit 110 adjusts the focus position of the image-pickup lens 22 in accordance with the manipulation of the focus ring 32 detected by the manipulation determination unit 120 (step S218), and returns to step S216.

Note that when a specified image identified by the specified-image identifying unit 160 exists during display enlargement, the image enlargement unit 150 displays the position of the specified image in an enlarged manner. Also, the enlargement control unit 140 may perform exposure adjustment on an as-needed basis in accordance with the enlargement target by using the AE control unit 114 during the manual focusing manipulation in step S216 and step S218.

Determining that it is not during the manual focusing (No in step S216), the enlargement control unit 140 calls the exposure value that was used before the display enlargement, and returns the exposure to the value that was used before the display enlargement by using the AE control unit 114 (step S220), and terminates the process of the image enlargement unit 150 so as to terminate the display enlargement (step S222).

FIG. 7 is again explained. The control unit 100 uses the manipulation determination unit 120 so as to determine whether or not manipulations other than those in step S108 or step S112 were made (step S116). Determining that another manipulation was made (Yes in step S116), the control unit 100 conducts control in accordance with the type of the manipulation (step S118). Determining that other manipulations were not made (NO in step S116), the control unit 100 skips the process in step S118.

The control unit 100 uses the manipulation determination unit 120 so as to determine whether or not an image-pickup manipulation was made (step S120). Determining that an image-pickup manipulation was not made (No in step S120), the control unit 100 returns to step S100.

Determining that an image-pickup manipulation was made (Yes in step S120), the control unit 100 picks up an image (step S122). The control unit 100 displays a picked-up image in the back surface display unit 50 etc., and conducts confirmation display (step S124). The control unit 100 determines whether or not the confirmation display has been conducted for a prescribed period of time (step S126), and continues as long as the prescribed period of time has not elapsed (No in step S126).

Determining that the confirmation display has been conducted for a prescribed period of time (Yes in step S126), the control unit 100 terminates the confirmation display. The control unit 100 uses the manipulation determination unit 120 so as to determine whether or not a power turn-down manipulation was made (step S128), and conducts the termination process so as to terminate the operation when it has determined that a power turn-down manipulation was made (Yes in step S128). Determining that a power turn-down manipulation was not made (No in step S128), the control unit 100 returns to step S100.

Again step S100 is explained. Determining that it is not in the image-pickup mode (No in step S100), the control unit 100 determines whether or not it is in the playback mode (step S140). Determining that it is in the playback mode (Yes in step S140), the control unit 100 reads the data of the picked-up image from the recording memory 210, uses the image process unit 200 so as to expand it, and plays the read picked-up image in the back surface display unit 50 etc. (step S144).

The control unit 100 determines whether or not an instruction was given to terminate the playback (step S146). Determining that an instruction was given to terminate the playback (Yes in step S146), the control unit 100 proceeds to step S128. Determining that an instruction was not given to terminate the playback (No in step S146), the control unit 100 uses the manipulation determination unit 120 so as to determine whether or not a transmission button (not shown) included in the manipulation unit 30 was manipulated (step S148). Determining that the transmission button was manipulated (Yes in step S148), the control unit 100 transmits the image that is being played to an external device via the USB, Wi-Fi, etc. of the communication unit 220 (step S150). The control unit 100 returns to step S144 after step S150.

Determining that the transmission button was not manipulated (No in step S148), the control unit 100 determines whether or not a manipulation of changing a played image was made (step S152). When the control unit 100 determines that a manipulation of changing a played image was made (Yes in step S152), the control unit 100 changes the image in accordance with the manipulation (step S154), and returns to step S144. Also, when the control unit 100 determines that a manipulation of changing a played image was not made (No in step S152), the control unit 100 returns to step S144.

Step S140 is again explained. Determining that it is not in the playback mode (No in step S140), the control unit 100 conducts for example a process of receiving an image from an external device or other processes in accordance with the set mode (step S142), and proceeds to step S128.

Figure 9:
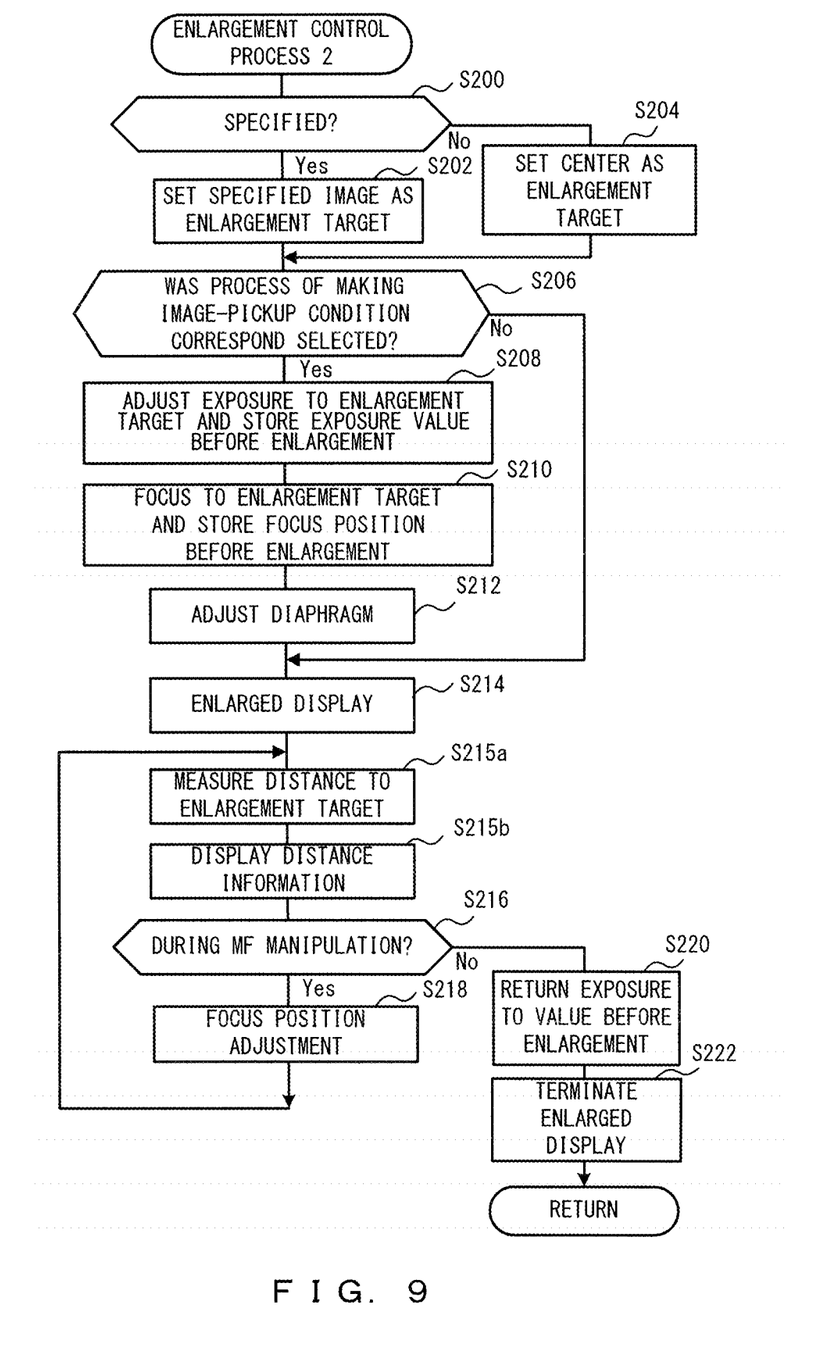
FIG. 9 shows a subroutine that explains procedures of enlargement control process 2.

Next, enlargement control process 2 will be explained. Enlargement control process 2 displays the current focus position and the distance to the enlargement target on the display enlargement screen in order to facilitate the focus adjustment during display enlargement. It is also possible to employ a configuration in which the user can select which of enlargement control processes 1 and 2 is to be conducted as an enlargement control process.

FIG. 9 shows a subroutine that explains procedures of enlargement control process 2. Regarding enlargement control process 2, the same processes as those in enlargement control process 1 are denoted by the same step numbers, and the same processes will be explained only briefly. From step S200 through step S214 are the same as those in enlargement control process 1, and thus the explanations thereof will be omitted.

The distance determination unit 170 measures the distance to the enlargement target (step S215a). The distance determination unit 170 measures the distance to the enlargement target by performing a process of finding a contrast peak when the mode of the AF is contrast AF, and measures the enlargement target by using phase difference information when the mode of the AF is imaging plane phase difference AF.

Figure 10:
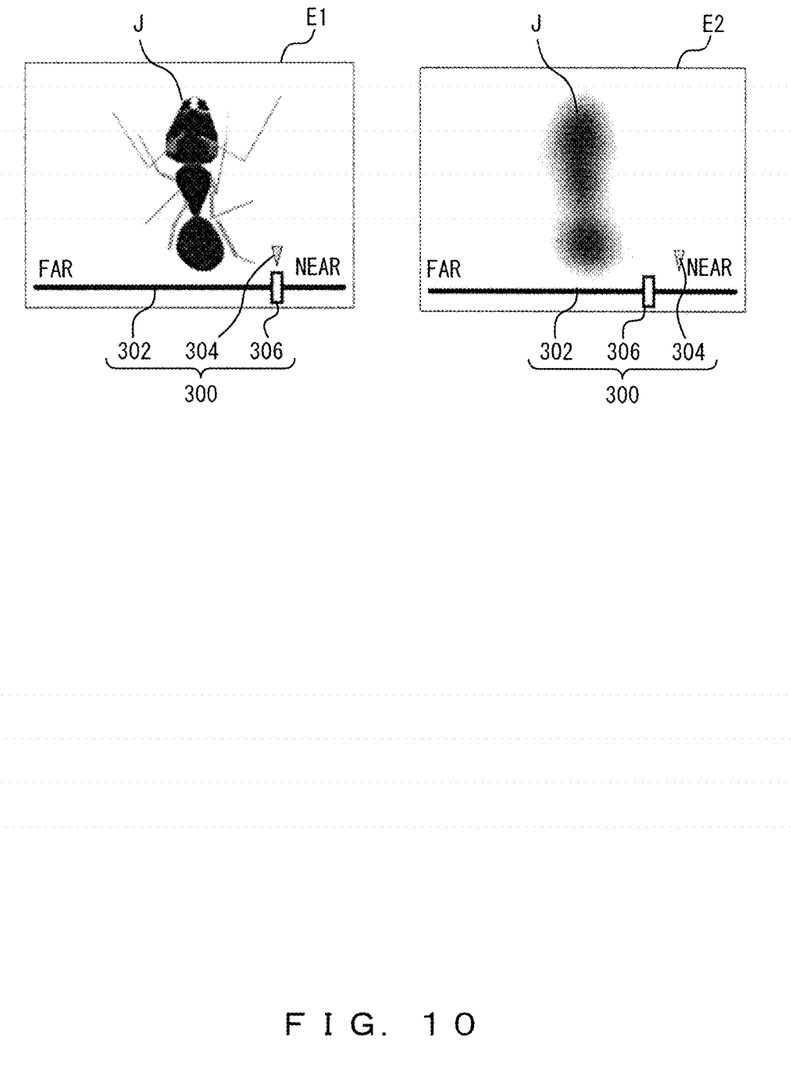
FIG. 10 shows an example in which a straight line represents a distance bar.
Figure 11:
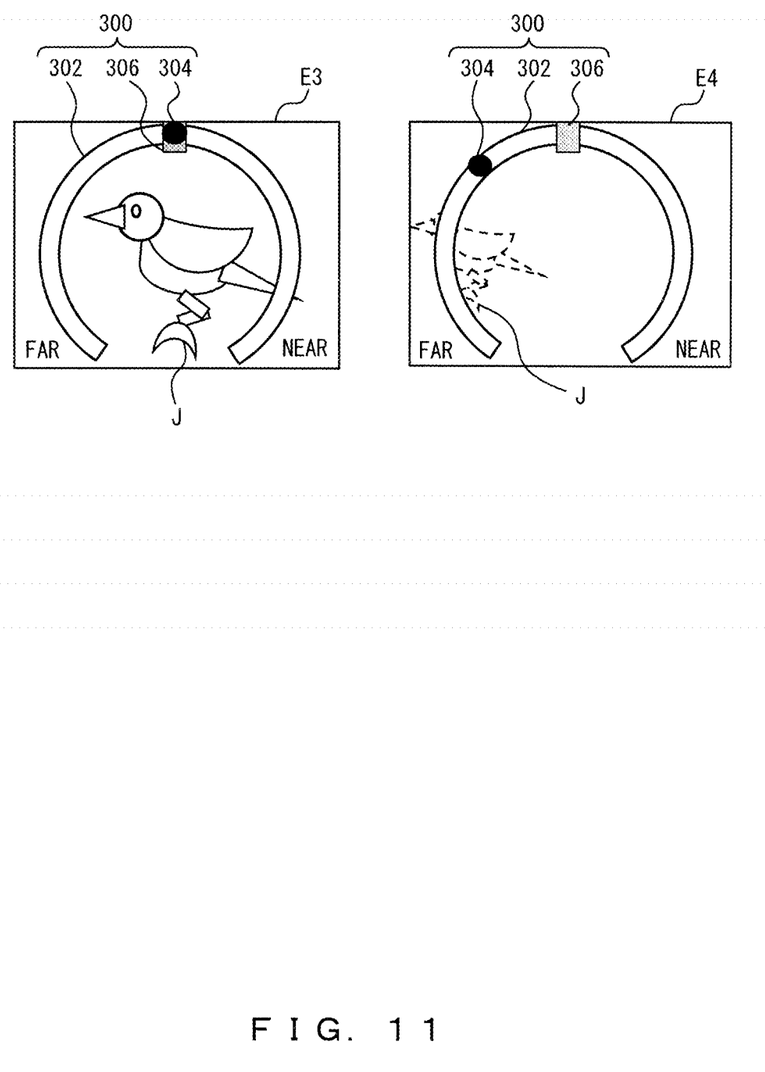
FIG. 11 shows an example in which an arc represents the distance bar.

The distance information generation unit 172 displays distance information representing the distance to the enlargement target and the position of the focus that is currently set (step S215b). FIG. 10 and FIG. 11 show display examples of distance information. FIG. 10 shows an example in which a straight line represents a distance bar 302 of distance information, and FIG. 11 shows an example in which an arc represents the distance bar 302.

In FIG. 10, the distance bar 302 is disposed horizontally along the bottom of the screen, and a distance mark 304 representing the distance between the position of the enlargement target and the image pickup device 1 and a focus mark 306 representing the current focus position of the image-pickup lens 22 are displayed on the distance bar 302. On the distance bar 302, the right side represents the near side, while the left side represents the far side. On screen E1 shown in FIG. 10, the focus mark 306 is at a position corresponding to the distance mark 304, meaning that the subject is in focus. On screen E2 shown in FIG. 10, the focus mark 306 is closer to the far side than is the distance mark 304, resulting in a state in which the subject is out of focus. On screen E2, the image of subject J is more unclear than that on screen E1.

In FIG. 11, the focus ring 32 is represented by an arc. On screen E3 shown in FIG. 11, the focus mark 306 is at a position corresponding to the distance mark 304, resulting in a state in which the subject is in focus. Screen E4 in FIG. 11 shows a state in which subject J has moved to a position that is in the left direction on the screen and to the far side. The image of subject J is more unclear on screen E4 than on screen E3.

FIG. 9 is explained again. The enlargement control unit 140 determines whether or not it is during the manual focusing (step S216). The determination of whether or not it is during the manual focusing is as explained in enlargement control process 1. Determining that it is during the manual focusing (Yes in step S216), the enlargement control unit 140 adjusts the focus position of the image-pickup lens 22 in accordance with the manipulation of the focus ring 32 detected by the manipulation determination unit 120 (step S218), and returns to step S215a.

Determining that it is not during the manual focusing (No in step S216), the enlargement control unit 140 calls the exposure value that was used before the display enlargement, and returns the exposure to the value that was used before the display enlargement by using the AE control unit 114 (step S220), and terminates the process of the image enlargement unit 150 so as to terminate the display enlargement (step S222).

Conventionally, display enlargement of a particular portion for the confirmation or adjustment of the focus often resulted in unclear display of the enlarged image. This is mainly because, in many cases, the enlarged portion was not brought into focus or the exposure was not set for that portion at the moment of the enlargement. Poor visibility deteriorates the usage even when display enlargement is conducted for assisting the adjustment of focus. Also, a high degree of blurring may lead to a situation in which the visual contact with a particular portion is lost on the screen, ruining the meaning of display enlargement.

According to the observation apparatus 10 of the present embodiment described above, image-pickup conditions set in accordance with an image that is not enlarged are changed in accordance with the enlargement target when display enlargement is to be conducted for adjusting the focus, making it possible to prevent a situation where display enlargement deteriorates the visibility or where the visual contact with the target is lost. Further, because the image-pickup conditions set in accordance with the image before being enlarged are stored, this makes it possible to shift immediately to the display of an image not in an enlarged state without measuring the image-pickup conditions again. As described above, according to the present embodiment, it is possible to provide an observation apparatus that clearly displays an enlarged portion when display enlargement is conducted.

Also, the observation apparatus 10 according to the present embodiment displays distance information in the display enlargement screen, realizing more comfortable manual focusing manipulations. As described above, the visibility of an image that the user wants to obtain has been improved while switching between screens appropriate for manipulations, preventing the user from being confused and allowing rapid manipulations.

In addition to being displayed on the back surface display unit 50 etc., an enlargement-target image may be stored and is recorded in such a manner that it is kept together with an image that is picked up but is not enlarged during the image-pickup manipulation.

It has been explained that the control unit 100 is implemented by a software process performed by a CPU that has read a control program, whereas part or the whole of the control unit 100 may be implemented by means of hardware.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS

1: IMAGE PICKUP DEVICE
10 OBSERVATION APPARATUS
20: IMAGE-PICKUP UNIT
22: IMAGE-PICKUP LENS
24: IMAGE PICKUP ELEMENT
26: IMAGE PICKUP PROCESS UNIT
30: MANIPULATION UNIT
40: TOUCH MANIPULATION UNIT
50: BACK SURFACE DISPLAY UNIT
60: EYEPIECE DISPLAY UNIT
70: STORAGE UNIT
100: CONTROL UNIT
110: IMAGE-PICKUP CONTROL UNIT
112: AF CONTROL UNIT
114: AE CONTROL UNIT
120: MANIPULATION DETERMINATION UNIT
130: DISPLAY CONTROL UNIT
140: ENLARGEMENT CONTROL UNIT
150: IMAGE ENLARGEMENT UNIT
160: SPECIFIED-IMAGE IDENTIFYING UNIT
170: DISTANCE DETERMINATION UNIT

172: DISTANCE INFORMATION GENERATION UNIT
200: IMAGE PROCESS UNIT
210: RECORDING MEMORY
220: COMMUNICATION UNIT

What is claimed is:

1. An observation apparatus comprising:
an image-pickup unit configured to pick up an image;
an image-pickup control unit configured to set an image-pickup condition of the image-pickup unit so as to control the image-pickup unit; and
an enlargement control unit configured to conduct control so that display enlargement is conducted for part of an observation image picked up by the image-pickup unit when a prescribed manipulation is made while the observation image is displayed, and to control the image-pickup control unit so that at least a portion of the image-pickup condition set on the basis of an observation image that is not enlarged is changed and set on the basis of a target for which the display enlargement is to be conducted, wherein
the enlargement control unit controls the image-pickup control unit so that both an exposure value image pickup condition of the image-pickup unit before start of the display enlargement and a focus position image pickup condition of the image-pickup unit before start of the display enlargement are stored and both the exposure value image pickup condition of the image pick-up unit and the focus position image pickup condition of the image pick-up unit are returned, after termination of the display enlargement, to the image-pickup conditions stored before start of the display enlargement.

2. The observation apparatus according to claim 1, wherein
the enlargement control unit controls the image-pickup control unit so that a reference for adjusting at least exposure or focus as the image-pickup condition is changed from the observation image that is not enlarged to a target for which display enlargement is to be conducted.

3. The observation apparatus according to claim 1, wherein
the enlargement control unit controls, when the display enlargement is conducted, the image-pickup control unit so that a reference for adjusting focus as the image-pickup condition is changed from the observation image that is not enlarged to a target for which display enlargement is to be conducted and so that autofocus is conducted, and thereafter gives permission for manual focusing after the execution of the autofocus.

4. The observation apparatus according to claim 1, wherein
the enlargement control unit conducts control so that display enlargement is conducted for part of the observation image when a manual focus manipulation is made as the prescribed manipulation.

5. The observation apparatus according to claim 1, wherein
the enlargement control unit conducts control so that a distance to the enlargement target is measured and the measured distance to the enlargement target and a current focus position of the image-pickup unit are displayed in an observation image for which the display is conducted.

6. The observation apparatus according to claim 1, wherein
the image-pickup unit includes a lens, and
the enlargement control unit widens or narrows an aperture of the lens when display enlargement is conducted.

7. An image observation method for an observation apparatus including an image-pickup unit for picking up an image, the method comprising:
a step of setting an image-pickup condition of the image-pickup unit so as to control the image-pickup unit;
a step of conducting display enlargement for part of an observation image picked up by the image-pickup unit when a prescribed manipulation is made while the observation image is displayed;
a step of storing an image-pickup condition before start of the display enlargement;
a step of storing both an exposure value image-pickup condition of the image-pickup unit and a focus position image-pickup condition of the image-pickup unit before start of the display enlargement;
a step of changing and setting at least a portion of the image-pickup condition set on the basis of an observation image that is not enlarged, on the basis of a target for which the display enlargement is to be conducted in the step of conducting display enlargement for part of the observation image; and
a step of returning both the exposure value image-pickup condition of the image-pickup unit and the focus position image-pickup condition of the image-pickup unit, after termination of the display enlargement, to the image-pickup conditions stored before start of the display enlargement.

8. A computer-readable non-transitory storage medium having a program for causing a computer, of an observation apparatus including an image-pickup unit for picking up an image, to execute an image observation process comprising:
a step of setting an image-pickup condition of the image-pickup unit so as to control the image-pickup unit;
a step of conducting display enlargement for part of an observation image picked up by the image-pickup unit when a prescribed manipulation is made while the observation image is displayed;
a step of storing both an exposure value image-pickup condition of the image-pickup unit and a focus position image-pickup condition of the image-pickup unit before start of the display enlargement;
a step of changing and setting at least a portion of the image-pickup condition set on the basis of an observation image that is not enlarged, on the basis of a target for which the display enlargement is to be conducted in the step of conducting display enlargement for part of the observation image; and
a step of returning both the exposure value image-pickup condition of the image-pickup unit and the focus position image-pickup condition of the image-pickup unit, after termination of the display enlargement, to the image-pickup conditions stored before start of the display enlargement.

* * * * *